Aug. 27, 1957  E. ROY  2,804,235
FEEDER FOR SCREW SLOTTING MACHINE
Original Filed Dec. 4, 1953  2 Sheets-Sheet 1
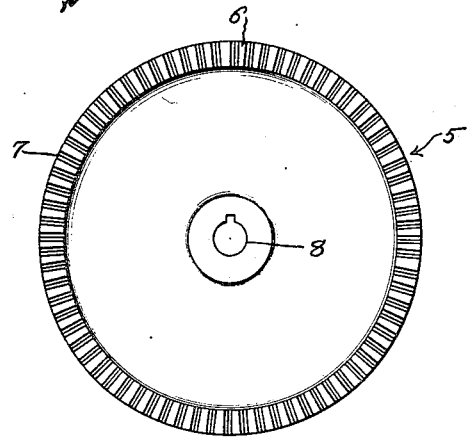
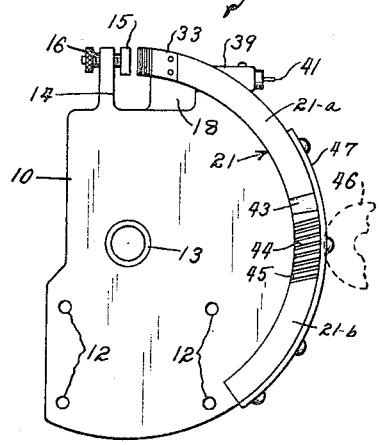
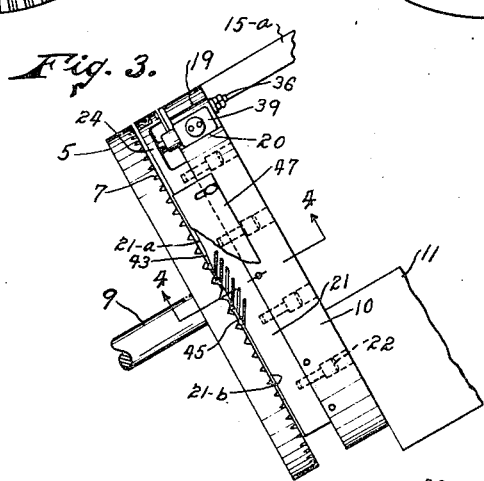
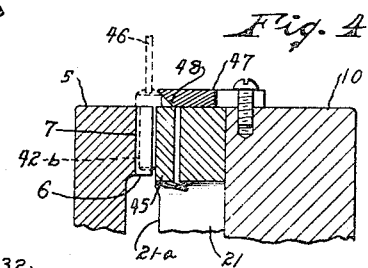
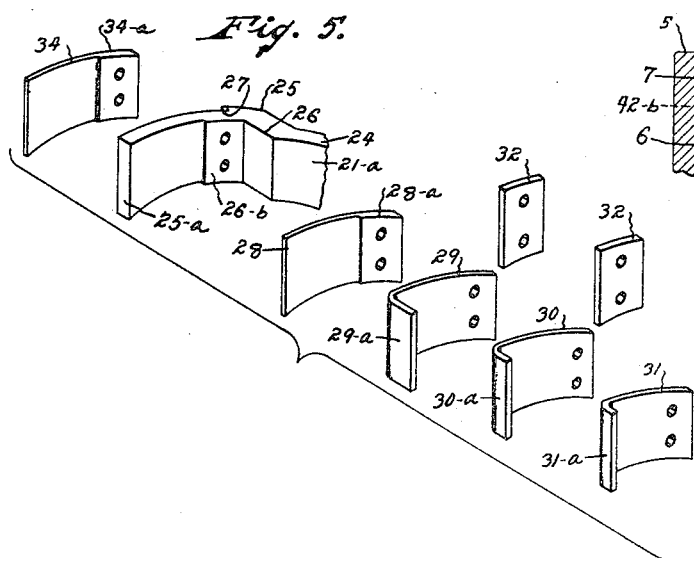
INVENTOR.
EMIL ROY
BY
ATTORNEY.

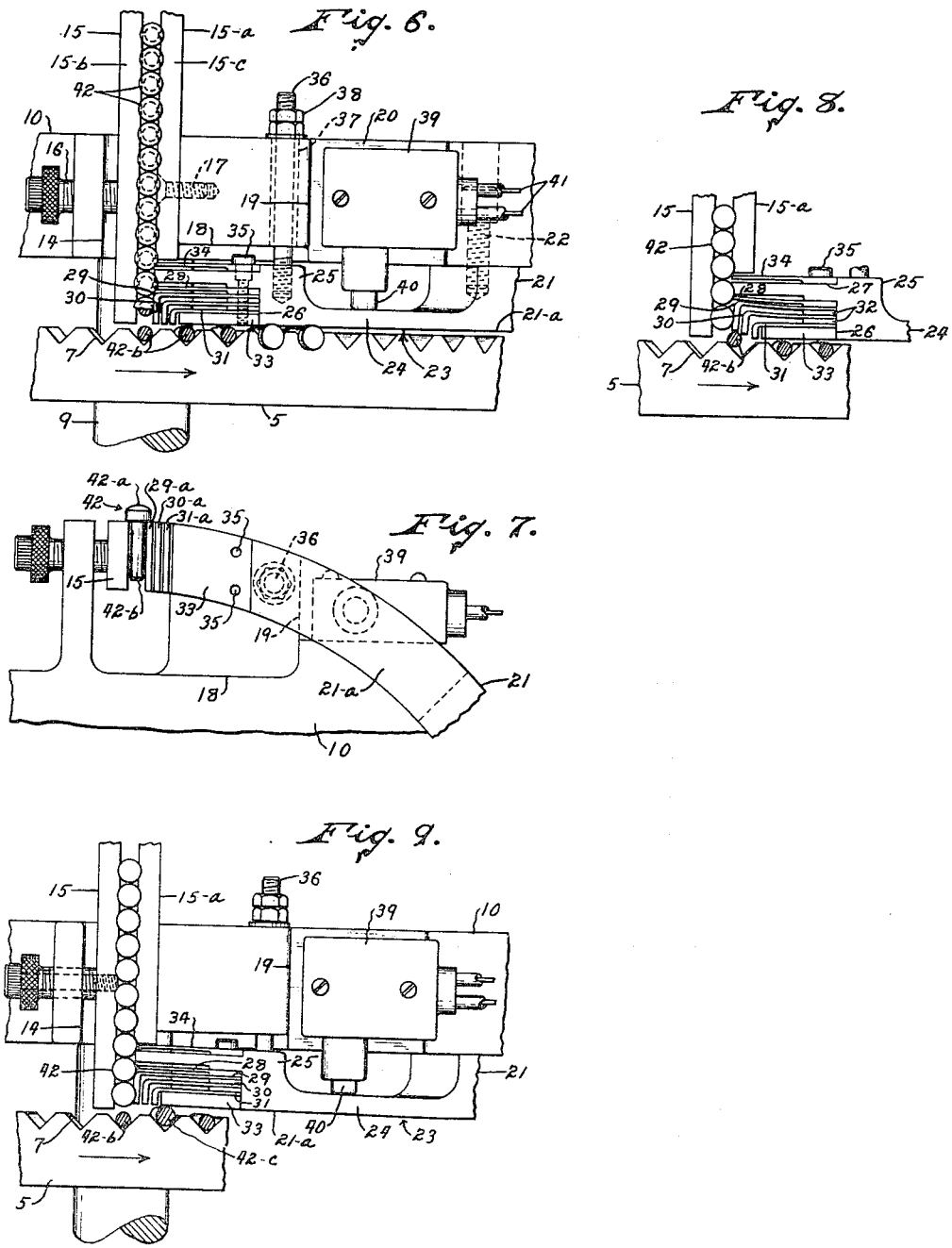

United States Patent Office 2,804,235
Patented Aug. 27, 1957

2,804,235

FEEDER FOR SCREW SLOTTING MACHINE

Emil Roy, Windsor, Conn.

Original application December 4, 1953, Serial No. 396,182, now Patent No. 2,745,571, dated May 15, 1956. Divided and this application February 10, 1955, Serial No. 487,264

6 Claims. (Cl. 221—21)

This invention relates to a feeder for screw slotting machine and more particularly to improved means in such a machine for terminating its operation upon the entry of an oversize screw blank into the carrier wheel thereof; this application being a division of my co-pending application Serial No. 396,182, filed December 4, 1953, and now Patent No. 2,745,571.

The instant invention is utilized to great advantage in a screw slotting machine of the type employing a rotatable carrier wheel having radial notches in a face thereof which receive the shanks of the screw blanks from a track extending perpendicularly to said face and which conveys said blanks to the carrier wheel from a suitable hopper. A stationary arcuate retaining plate is disposed adjacent said face of the carrier wheel and is adapted to be engaged by the shanks of the screw blanks immediately after they are fed into said notches, and by means of which said blanks are retained in said notches as they are carried in a circular path. The lower portion of the retaining plate is of a greater thickness than the upper portion, thereby providing a raised surface or a clamping section on the face of the retaining plate which is engaged by the shanks of the blanks carried therepast and by means of which said blanks are clamped tightly in their respective notches against rotation and radial movement while they are carried past the slotting saw which cuts a screw driver slot in the head of each blank.

In machines of this type, it is possible for a screw blank having an oversize shank to be delivered from the track member into one of the notches in the carrier wheel without detection. However, if such a blank is carried into engagement with the clamping section of the retaining plate, it will, due to its larger shank diameter, force the face of the carrier wheel away from the clamping section of the retaining plate so that the adjacent screw blanks of proper size are not tightly clamped as they enter the clamping section and are liable to be pulled radially from their notches in the carrier wheel upon engagement with the slotting saw and severely damage or break said saw. It is, therefore, extremely important that oversize blanks be prevented from entering the clamping section of the retaining plate, and it is the primary object of this invention to provide improved means for detecting the presence of an oversize blank as soon as it enters the carrier wheel and for immediately terminating the operation of the machine.

The many objects of this invention are realized by providing a resilient arm on the retaining plate having a free end adjacent the feed-in point for the screw blanks; said arm being adapted to operate a switch for shutting off the machine upon the entry of an oversize blank into one of the notches in the carrier wheel. This and other objects of the present invention will be more clearly understood from the following description and the accompanying drawings in which:

Fig. 1 is an elevational view illustrating the face of the rotatable carrier wheel.

Fig. 2 is a similar view illustrating the retaining plate embodying the instant invention and the supporting plate upon which it is carried.

Fig. 3 is a side view of the carrier wheel and the retaining plate illustrating the relative positions which they occupy when assembled in the machine.

Fig. 4 is a fragmentary sectional end view taken on line 4—4 of Fig. 3.

Fig. 5 is an exploded isometric view illustrating the head at the free end of the arm on the retaining plate and the springs carried thereby.

Fig. 6 is a top view, on an enlarged scale, of the carrier wheel and the retaining plate when the slotting machine is operating normally.

Fig. 7 is a fragmentary elevational view further illustrating the construction of my novel retaining plate.

Fig. 8 is a view similar to Fig. 6, illustrating the operation of the spring means on the retaining plate.

Fig. 9 is a plan view, similar to Fig. 6, illustrating the position assumed by the resilient arm on the retaining plate upon the entry of an oversize blank into one of the notches in the carrier wheel and the manner in which the shut-off switch is operated thereby.

Referring now to the drawing, wherein the pertinent parts of the screw slotting machine embodying my invention are illustrated, it will be noted that said machine includes a circular carrier wheel 5 having an annular flange 6 extending from its face in which is formed a plurality of radially disposed, equally spaced, V-shaped notches 7. The carrier wheel has a centrally disposed opening 8 therethrough which receives a shaft 9, to which said carrier wheel is keyed, and said shaft is rotated by suitable driving means (not shown) to cause rotation of the carrier wheel.

A supporting plate 10 is secured to a base member 11 of the machine by means of bolts or the like which extend through holes 12 therein and, when assembled in the machine, said plate and carrier wheel are disposed in parallel relation at an angle of approximately thirty degrees to the vertical, as shown in Fig. 3. The shaft 9 extends through the opening 8 in the carrier wheel and into a suitable bearing 13 in the supporting plate to thereby firmly support said wheel. The upper portion of the supporting plate 10 contains a radial slot 14 which receives elongated flat bars, or track members, 15 and 15–a that extend perpendicularly to the face of the carrier wheel from the hopper (not shown) of the machine and form the conveyor track for the screw blanks. Said track members are disposed with their opposed flat surfaces in parallel spaced relation and their upper edges 15–b and 15–c, respectively, coplanar and lying in a plane substantially tangent to the periphery of the carrier wheel. The screw blanks are supported on said upper edges by their heads and the shanks of said blanks hang downwardly between the flat sides of said members. The track member 15 is adjustably supported by adjusting screws, such as shown at 16, which permit its adjustment towards and away from the stationary track member 15–a, that is secured to the plate 10 by screw 17, to accommodate screw blanks of various sizes. It will be noted, particularly from Fig. 6, that the end of the stationary track member 15–a terminates substantially flush with the face of the supporting plate, and that the movable track member 15 extends therebeyond and terminates closely adjacent the face of the carrier wheel. A recess 18 is formed in the face of the supporting plate 10 and extends from the slot 14 to the side of a notch 19 in the periphery of the supporting plate which provides a flat supporting surface 20 thereon for a purpose to be hereinafter described.

An arcuate retaining plate 21 is fastened to the surface of the supporting plate 10 by means of cap screws 22 which extend through holes in said supporting plate and is disposed with its retaining surface 21–a spaced from and facing the notches 7 in the carrier wheel; said retaining plate being slightly wider than the flange 6, but having its periphery flush with that of the carrier wheel as shown in Fig. 4. The upper end portion 23 of the retaining plate 21 is suitably formed to provide a relatively thin resilient arm 24 which extends from the rigid portion of the retaining plate and has at its free end a head 25 which is disposed in front of the notch 18 in the supporting plate. The free end 25–a of the head 25 extends perpendicularly to the retaining surface 21–a and is disposed in alignment with the inner flat surface of the stationary track member 15–a, and the peripheral surface of said head is flush with the upper edges 15–b and 15–c of the track members. The said head contains, at the forward corner thereof, a notch 26 which extends inwardly from the retaining surface, and the bottom of said notch has a step forming a platform 26–b. The rear surface of the head contains a separate, but shallower, notch 27 thus spacing the rear surface of the head from the end of the stationary track member 15–a as illustrated in Fig. 6.

The notch 26 in the front of the head contains a plurality of spring members, the innermost of which is in the form of a flat leaf spring 28 which is supported on the platform 26–b to space said spring from the bottom of the notch and is provided with a heel portion 28–a of increased thickness. The free outer edge of the spring 28 terminates in alignment with the end of the head 25 and the inner surface of the stationary track member. The remaining spring members contained within the notch 26 are in the form of flat L-shaped springs 29, 30 and 31 of progressively smaller size, each of which has a perpendicularly extending finger 29–a, 30–a and 31–a, respectively. Said springs are disposed in nested relation with the free ends of the fingers terminating flush with the surface 21–a of the arm 24, and the said fingers are of increased thickness to reduce the space therebetween. The largest spring member 29 is supported against the heel portion 28–a of the leaf spring 28 to thereby space said spring members apart, and the side of the perpendicular finger 29–a thereof is disposed in alignment with the inner surface of the stationary track member 15 and the ends of the head 25 and the spring 28. The spring members 30 and 31 are spaced apart by spacers 32—32 and a filler block 33 is secured against the outermost spring 31 with its outer flat surface flush with the retaining surface 21–a.

A flat leaf spring 34, similar to the leaf spring 28, is received in the notch 27 in the rear surface of the head and said spring member has a heel 34–a of increased thickness which rests against the bottom of the notch 27 and spaces the remainder of the spring therefrom. Said spring extends into the space between said head and the end of the stationary track member 15 and terminates in alignment with its inner surface. The spring members, spacer blocks 32—32 and the filler block 33 are secured to the head by screws 35—35 which pass through holes therein and are threaded to said filler block. It will be noted that the spring member 34 reduces the width of the space between the head 25 and the end of the track member 15–a, and that the spring member 28 reduces the width of the space between the head and the back of the spring 29 to thereby prevent the shanks of the screw blanks, particularly those of small diameter, from entering or catching in said spaces and disrupting the flow of blanks down the conveyor track. Each of the spring members carried on the head is of substantially the same width as the retaining plate and the upper curved edges thereof are flush with the peripheries of the retaining plate and the carrier wheel and thereby provide a supporting surface for the heads of the screw blanks or, in effect, an extension of the track member 15–a.

The screw slotting machine includes means (not shown) for moving the base member 11 that carries the supporting plate 10 to permit adjustment of the retaining plate relatively to the carrier wheel so as to vary the space therebetween to accommodate screw blanks of different sizes. Adjustment of the resilient arm 24 is also sometimes necessary and for that reason I have provided a stud 36 that is threaded into the head 25 and extends through a hole 37 in the supporting plate, which is substantially larger than the stud, and is provided at its end with adjusting nuts 38.

A micro-switch 39 of conventional construction is secured to the flat surface 20 of the notch 19 in the periphery of the supporting plate and is provided with an actuating button 40 which extends into engagement with the rear surface of the resilient arm 24 on the retaining plate. Said switch is connected in the circuit to the motor which drives the machine through electrical conductors 41.

In the normal operation of the machine, the screw blanks, indicated at 42, move from the hopper down the conveyor track in which they are supported by their heads 42–a with the shanks 42–b of the blanks depending between the track members 15 and 15–a. As the screw blanks approach the end of the track, they are supported at one side on the surface of the head 25 and finally upon the edge of the finger 29–a on the spring 29. The carrier wheel 5 is rotating at a constant speed in a clockwise direction, as indicated by the arrows in Figs. 6, 8 and 9, and as each of the notches 7 therein comes into register with the row of screw blanks in the track, the shank of the blank adjacent the face of the wheel is gravitally urged into said notch and the screw blank is supported therein by its head which extends over the periphery of the carrier wheel at one side, and over the edges of the springs on the retaining plate at the other side. The shanks of said blanks are then carried past the ends of the spring fingers at the corner of the head 25 and over the retaining plate 21 whose retaining surface 21–a retains said blanks in their respective notches.

The lower portion of the retaining plate 21 is of a greater thickness than the upper portion thereof which brings its surface 21–b closer to the face of the flange on the carrier wheel, as illustrated in Fig. 3, and provides a clamping section on said retaining plate. A ramp surface 43 extends upwardly from the surface 21–a of the retaining plate to the surface 21–b on the clamping section thereof, and a plurality of slots 44 are cut into the clamping section at an angle to its face to provide spring fingers 45 having their free ends facing the flange on the carrier wheel. As the screw blanks are carried around in a circular path by the carrier wheel, their shanks are urged tightly into the notches upon engagement with the ramp surface and are securely clamped between the faces of the notches and the ends of the spring fingers 45 to prevent rotation of the screw blanks as the heads thereof pass the slotting saw, indicated at 46, which cuts a screw driver slot in each of said heads. The spring fingers 45, which are fully described in my co-pending application Serial No. 432,819, filed May 27, 1954, and now abandoned, assure positive clamping of each blank since the diameters thereof sometimes vary due to manufacturing tolerances.

After the screw blanks pass beyond the lower end of the retaining plate they drop from the notches in the carrier wheel into a suitable container. To further guard against radial movement of the screw blanks in the notches, an adjustable retaining band 47 may be secured to the periphery of the supporting plate 10; said band being provided with a beveled edge 48 which overlies a small portion of the heads 42–a of the screw blanks.

As above mentioned, the weight of the screw blanks in the track is usually sufficient to cause entry of the first blank into its respective notch in the proper manner. However, should the first screw blank in the track be delayed or slowed down for any reason, it will not enter its respective notch in the constantly rotating carrier wheel in the proper position, but will be picked up on the approaching face of the notch as illustrated in Fig. 8. When this occurs, the shank of the screw blank will successively engage the ends of the spring fingers 29–a, 30–a and 31–a as it is carried along by the wheel 5 and cause said fingers to yield so that said shank can pass by the ends thereof in the manner illustrated in Fig. 8. The springs will then gradually urge the shank of the screw blank down into its notch before said shank reaches the end of the filler block 33 and jamming of the machine will thereby be prevented. It will be noted from Fig. 8 that if the first spring member 29 is displaced a considerable amount upon engagement by the shank of a screw blank, it will engage and bend the leaf spring 28 therebehind which causes an additional force to be applied to the shank for urging it rapidly into proper position in its notch in the carrier wheel.

Referring now to Fig. 9, it will be seen that if a screw blank, illustrated in an exaggerated manner at 42–c, having a shank diameter greater than that for which the machine is adjusted should enter one of the notches in the carrier wheel, it will be carried thereby past the spring fingers and into engagement with the face of the filler block 33. The oversize blank will then urge the head 25 in a rearward direction and bend the resilient arm 24 on said retaining plate. This will, in turn, cause depression of the actuating button 40 on the micro-switch which will cause operation of said switch to immediately shut off the machine.

It will be noted that as the head is moved rearwardly upon engagement by the oversize blank, the spring member 34 is carried into engagement with the end of the stationary track member 15 and yields to permit movement of said head.

The oversize blank may be removed from the carrier wheel by moving the base member 11, upon which the retaining plate is carried, away from the carrier wheel. The arm 24 will return to its normal position and after the retaining plate is again properly adjusted relatively to the carrier wheel, the machine may again be put into operation. It will be noted that the nuts 38 on the stud 36 limit the return of the head 25 on the retaining plate to its normal position as illustrated in Fig. 6.

I claim:

1. In a screw slotting machine, a movable carrier member having a plurality of notches in a face thereof adapted to receive the shanks of screw blanks, a pair of spaced track members extending perpendicularly to said face for feeding blanks into said notches; the end of one of said track members being spaced from said face a greater distance than the other, a retaining member adjacent said face of the carrier member adapted to engage the shanks of the blanks and retain them in said notches and having a free end portion disposed between said end of the track member and said face of the carrier member and forming an extension of said track member; said end portion of the retaining member being movable away from the carrier member upon engagement thereof by the shank of an oversize blank in one of said notches, and means operable by said end portion for terminating the operation of the machine.

2. In a screw slotting machine, a movable carrier member having a plurality of notches in a face thereof adapted to receive the shanks of screw blanks, a pair of spaced track members extending perpendicularly to said face for feeding blanks into said notches; the end of one of said track members being spaced from said face a greater distance than the other, a retaining plate having a retaining surface adjacent said face of the carrier member adapted to engage the shanks of the blanks and retain them in said notches; said retaining plate including a resilient arm having a free end portion disposed in the space between said end of the track member and the carrier member and spaced from said track member to permit rearward movement of said arm upon engagement of the retaining surface thereof by an oversize blank in one of said notches, resilient means disposed between said end of the track member and the free end of said arm to prevent entry of the shanks of the screw blanks therebetween, and switch means operable upon movement of said arm to terminate the operation of said machine.

3. The subject matter set forth in claim 2 wherein said resilient means includes a flat spring member whose end portion is disposed between said end of the track member and the free end of said arm and in spaced relation thereto; the free end of said spring terminating substantially flush with the face of said track member.

4. In a screw slotting machine, a movable carrier member having a plurality of notches in a face thereof of a size to receive the shank of a single screw blank, means for feeding blanks into said notches, retaining means adjacent said face of the carrier member for retaining said blanks in said notches, said retaining means including a fixed stationary member having a retaining and clamping surface adjacent and spaced from said face of the carrier member adapted to engage the shanks of blanks carried therepast and retain and clamp them in said notches during the slotting operation, and a movable member extending from said fixed stationary member and terminating at the point where said blanks enter said notches; said movable member having a blank retaining and guiding surface extending therealong adjacent and in spaced relation to said face of the carrier member and joining said retaining and clamping surface, said retaining and guiding surface being normally adapted to engage the shanks of blanks carried therepast and retain them in said notches, whereby said movable member normally serves as a blank retainer and guide while being adapted to move away from said face of the carrier member upon engagement of said retaining and guiding surface by the shank of an oversize blank in one of said notches, and means operable upon movement of said movable member for terminating the operation of said carrier member before said oversize blank reaches said retaining and clamping surface.

5. In a screw slotting machine, a movable carrier member having a plurality of notches in a face thereof of a size to receive the shank of a single screw blank, means for feeding blanks into said notches, a retaining plate adjacent said face of the carrier member for retaining said blanks in said notches, said retaining plate including a fixed stationary section having a retaining and clamping surface adjacent and spaced from said face of the carrier member adapted to engage the shanks of blanks carried therepast and retain and clamp them in said notches during the slotting operation, and an integral, resilient, free arm extending from the end of said fixed stationary section and terminating at the point where said blanks enter said notches; said arm having a blank retaining and guiding surface extending therealong adjacent and in spaced relation to said face of the carrier member and joining said retaining and clamping surface; said retaining and guiding surface being normally adapted to engage the shanks of blanks carried therepast and retain them in said notches, whereby said arm normally serves as a blank guide while being adapted to yield in a direction away from said face of the carrier member upon engagement of said retaining and guiding surface by the shank of an oversize blank in one of said notches, and means operable by said arm upon movement thereof for terminating the operation of said carrier member before said oversize blank reaches said retaining and clamping surface.

6. In a screw slotting machine, a movable carrier member having a plurality of notches in a face thereof of a size to receive the shank of a single screw blank, means for feeding blanks into said notches, a retaining plate adjacent said face of the carrier member for retaining said blanks in said notches, said retaining plate including a fixed stationary section having a retaining and clamping surface adjacent and spaced from said face of the carrier member adapted to engage the shanks of blanks carried therepast and clamp them in said notches during the slotting operation, and an integral, resilient, free arm extending from the end of said fixed stationary section and terminating at the point where said blanks enter said notches; said arm having a blank retaining and guiding surface extending therealong adjacent said face of the carrier member and spaced therefrom a greater distance than said clamping surface adapted to engage the shanks of blanks carried therepast and retain them in said notches; an intermediate surface on said retaining plate extending from said blank retaining and guiding surface to said clamping surface, whereby said arm normally serves as a blank guide while being adapted to yield in a direction away from said face of the carrier member upon engagement of said retaining and guiding surface by the shank of an oversize blank in one of said notches, and switch means operable upon movement of said arm to terminate the operation of said carrier member before said oversize blank reaches the retaining and clamping surface.

References Cited in the file of this patent

UNITED STATES PATENTS

| | | |
|---|---|---|
| 2,339,638 | Henszey et al. | Jan. 18, 1944 |
| 2,621,343 | Fray | Dec. 16, 1952 |
| 2,657,403 | Eade et al. | Nov. 3, 1953 |